United States Patent Office 3,557,222
Patented Jan. 19, 1971

3,557,222
HYDROLYSIS OF BENZYL CHLORIDE TO
BENZYL ALCOHOL
Henry W. Withers, Jr., and John L. Rose, Jr., Chattanooga, Tenn., assignors to Velsicol Chemical Corporation, Chattanooga, Tenn., a corporation of Tennessee
No Drawing. Filed Feb. 19, 1968, Ser. No. 706,677
Int. Cl. C07c 29/00
U.S. Cl. 260—618                                                    10 Claims

ABSTRACT OF THE DISCLOSURE

A continuous process for preparing benzyl alcohol which comprises continuously charging benzyl chloride and an aqueous alkaline solution to a hydrolysis zone at a rate adjusted to provide turbulent flow therein, effecting the hydrolysis of the benzyl chloride to form benzyl alcohol at elevated temperature and pressure within the hydrolysis zone, continuously withdrawing the effluent from the hydrolysis zone and thereafter recovering the benzyl alcohol contained therein.

---

This invention relates to a process for producing benzyl alcohol and, more particularly, to a process for producing benzyl alcohol by the continuous hydrolysis of benzyl chloride.

Benzyl alcohol is a valuable chemical having a wide number of industrial applications such as a solvent for dye systems and as a perfume blender. In many of these applications an essential requirement permitting the utilization of benzyl alcohol is that it be substantially free of impurities and, particularly, chlorinated materials. This is an especially serious limitation because benzyl alcohol is conventionally prepared by the alkaline hydrolysis of benzyl chloride which provides a ready source of chlorinated impurities. These impurities moreover are corrosive and are not readily removed from the crude benzyl alcohol product by conventional methods, and consequently costly and tedious techniques must be employed to remove the chlorinated impurities to the very low level usually required. To avoid this problem, the hydrolysis reaction is usually conducted so that it goes substantially to completion so as to preclude the presence of substantial quantities of unconverted benzyl chloride in the crude alcohol product. Employment of this technique, however, particularly on a large industrial scale, requires lengthy hydrolysis periods often ranging up to 20 or 30 hours or more if substantially all of the benzyl chloride is to be hydrolyzed. To obtain these lengthy reaction periods it generally is necessary to effect the hydrolysis in a batch-type operation which involves several serious disadvantages. Aside from the unfavorable economic aspects of batch-type operation, in order to effect the batch-type operation efficiently, it is necessary to minimize the ratio of the aqueous alkaline phase to the benzyl chloride phase so as to produce more alcohol per batch charge. This, however, results in a substantial increase in an undesirable by-product, dibenzyl ether, and further prolongs the hydrolysis period required to hydrolyze substantially all of the benzyl chloride. Notwithstanding the disadvantages of batch type operation, however, it is still generally the standard industrial procedure employed for hydrolyzing benzyl chloride to benzyl alcohol because the critical requirement of a substantially chlorine-free product outweighs the economic gains of continuous processing.

It is an object of this invention, therefore, to provide a continuous process for producing benzyl alcohol by the continuous hydrolysis of benzyl chloride which is capable of producing an alcohol product substantially free of any unconverted benzyl chloride. A further object is to provide a process for continuously producing benzyl alcohol by the continuous hydrolysis of benzyl chloride which is capable of converting substantially all of the benzyl chloride to benzyl alcohol and, moreover, with negligible simultaneous production of the undesired by product, dibenzyl ether. These and other objects of this invention will be apparent from the following further detailed description thereof.

The objects of this invention are realized by effecting the hydrolysis of benzyl chloride according to an interrelated combination of processing steps or features which comprise continuously charging benzyl chloride and an aqueous alkaline solution to a hydrolysis zone at a rate adjusted to provide turbulent flow therein, effecting the hydrolysis of the benzyl chloride to benzyl alcohol at an elevated temperature and pressure within the hydrolysis zone, continuously withdrawing the reaction effluent from the hydrolysis zone and thereafter recovering the benzyl alcohol product contained therein. Utilization of this combination of processing features or steps to effect the hydrolysis of benzyl chloride permits the continuous production of a crude benzyl alcohol product which is substantially free of unconverted benzyl chloride and, moreover, contains a minimum of the undesirable by-product, dibenzyl ether.

The aqueous alkaline solution which is charged to the hydrolysis zone to effect the hydrolysis of the benzyl chloride is composed of water and an alkaline component. This alkaline component comprises at least one material selected from a group consisting of alkali metal and alkaline earth metal hydroxides or carbonates. Included within the group of alkaline materials which can be utilized as the alkaline component are such materials as sodium hydroxide, sodium carbonate or calcium hydroxide. Of the various materials which can be utilized, sodium hydroxide and sodium carbonate are preferred and, especially, sodium carbonate when very low levels of the by-product dibenzyl ether are desired. The relative proportions of the water and the alkaline component in the aqueous alkaline solution are important to the success of the process and must be within a particular range if the process is to be effective in producing a benzyl alcohol product substantially free of dibenzyl ether within extremely short reaction periods. While the relative proportions of water and the alkaline component can be varied, depending upon such factors as the particular alkaline component utilized, the alkaline component generally should be present in the alkaline solution in an amount ranging from about 2 to 20 weight percent of the solution. A more limited range is preferred, especially to minimize dibenzyl ether formation and to maximize the rate of reaction and, preferably, when using sodium carbonate as the alkaline component ranges from about 5 to 15 or about 10 weight percent of the solution.

Due to the effectiveness of the process of this invention in continuously hydrolyzing benzyl chloride to benzyl alcohol, the benzyl chloride charged to the hydrolysis zone and into contact with the aqueous alkaline solution can be admixed with other related chlorinated materials such as benzal chloride and benzotrichloride without substantially affecting the efficiency of the hydrolysis. However, because such material can interfere with a ready recovery of a highly pure, crude benzyl alcohol product, it is preferred that the benzyl chloride charged to the hydrolysis zone be substantially free of such materials. In one of the features of this invention the benzyl chloride is charged to the hydrolysis zone admixed with an inert solvent. Employment of such a solvent permits a further reduction of the dibenzyl ether by-product to an almost negligible level and, accordingly, is a preferred feature of this invention when an extremely pure crude benzyl alcohol product is desired substantially free of dibenzyl ether. Aromatic hydrocarbon solvents in which both the benzyl chloride and the benzyl alcohol product are soluble can be suitably utilized as the inert solvent and include such solvents as benzene, xylene, toluene, or ethyl benzene or mixtures thereof with toluene being particularly preferred. The quantity of the solvent used can be varied depending upon such factors as the particular solvent or combination utilized. Generally, however, the quantity of solvent used should be within the range of from about 0.5 to 2 weight parts of solvent per 1 weight part of benzyl chloride with a range of about 8 parts solvent to 10 parts benzyl chloride to about 10 parts solvent to about 8 parts benzyl chloride or about equal weight parts of solvent and benzyl chloride being preferred especially when using such solvents as toluene.

The hydrolysis zone wherein the benzyl chloride and aqueous alkaline solution are brought into reactive contact to effect the hydrolysis of the benzyl chloride to benzyl alcohol can consist of any standard reactor wherein liquid phase reactions can be effected continuously at elevated temperatures and pressures. The reactor employed for the hydrolysis zone should, however, be capable of maintaining the benzyl chloride and aqueous alkaline solution in a highly agitated state with a minimum of back-mixing of the reactants and should be capable of providing a plurality of theoretical mixing stage equivalents in series. As used herein, one theoretical stage is defined as the equivalent of one well-mixed vessel that gives equal concentrations in the vessel and in the vessel effluent. Conveniently, a shell and tube-type reactor can be used where the reactants pass within a single, continuous tube enclosed as a continuous coil within the shell or housing and where the tubular reactor coil is heated externally by a heating medium flowing over the tube confined by the shell. When utilizing this type of continuous tube or pipeline reactor, it should be designed to provide at least the equivalent of from 50 to 500 theoretical mixing stage equivalents in series and a length to diameter ratio of at least about 1000 to 1.

In charging the aqueous alkaline solution and the benzyl chloride, with or without an admixed solvent, to the hydrolysis zone, it is important to the success of the process particularly with regard to producing an alcohol product substantially free of unconverted benzyl chloride as well as dibenzyl ether that the benzyl chloride and aqueous alkaline solution be in a highly agitated and thoroughly mixed state within the hydrolysis zone. This is readily achieved according to this invention by charging the benzyl chloride and the aqueous alkaline solution to the hydrolysis zone at a rate sufficient to provide a turbulent flow rate within the hydrolysis zone. If the flow rate of the reactants is below the level necessary to provide turbulent flow, that is where the flow rate of the reactants is in the laminar flow range, then the hydrolysis will not proceed to substantial completion within reasonable reaction residence periods with the result that one of the principal objectives of the process, namely, substantially complete conversion of the benzyl chloride, will not be achieved. While the charge rate of the reactants must be sufficiently high so as to produce turbulent flow within the hydrolysis zone, the particular rate chosen above the minimum threshold level for a turbulent flow can be varied with the particular rate chosen being dependent upon such factors as the type of reactor used in the hydrolysis zone, the desired pressure drop across the reactor as well as the reactor residence time required to achieve substantially complete conversion of the benzyl chloride at the particular operating temperature and pressure. Conveniently, the appropriate rate can be readily determined by calculating the flow rate necessary to achieve a Reynolds number of at least above about 2100 and, more preferably, above about 4000 and ranging up to as high as 80,000 with typical Reynolds numbers ranging from about 5000 to 60,000. As used herein the term "Reynolds number" may be defined by the term $LV_{\rho/\mu}$ where L is a characteristic linear dimension of the apparatus through which the flow is taking place; V is the linear velocity; $\rho$ is the density and $\mu$ is the absolute viscosity and can be determined by the procedures set forth in Perry's Chemical Engineer's Handbook, fourth edition, McGraw-Hill, New York, 1963.

In charging the benzyl chloride and the aqueous alkaline solution to the hydrolysis zone while different techniques can be employed, the most desirable results particularly with regard to minimal dibenzyl ether production are achieved when they are charged in admixture to the hydrolysis zone and, preferably, in a highly agitated and thoroughly mixed state. This can be readily achieved by first charging the aqueous alkaline solution and the benzyl chloride in separate streams in the desired respective proportions to a mixing zone wherein the two separate streams can be mixed and then passed as a single feed stream to the hydrolysis zone.

The relative proportions of the benzyl chloride and the aqueous alkaline solution charged to the hydrolysis zone can be varied. Generally, however, in order to obtain an alcohol product substantially free of unconverted benzyl chloride as well as dibenzyl ether and in extremely short reaction periods, the alkaline component contained in the aqueous alkaline solution should be maintained in an excess above the stoichiometric quantity required to hydrolyze each mol of benzyl chloride charged to the hydrolysis zone. While the level of excess of the alkaline component can be varied, depending upon such factors as the particular alkaline component utilized, it generally can range from as low as about 1 to 5 mol percent to as high as 60 to 75 mol percent above the stoichiometric quantity required to hydrolyze each mol of the benzyl chloride. Conveniently, a more limited range is utilized particularly to minimize the amount of the alkaline component employed and preferably ranges from about 5 to about 15 or about 10 mol percent above the stoichiometric quantity. Once the particular quantity of the alkaline component has been selected for each mol of benzyl chloride charged, then the quantity of water in the alkaline solution can be adjusted to obtain the desired concentration for that amount of the alkaline component within the ranges hereinbefore set forth.

The conditions used in effecting the continuous process of this invention are an important factor in influencing the success of the process in continuously producing a crude alcohol product which is substantially free of substantial amounts of unconverted benzyl chloride and dibenzyl ether at high reaction rates. Generally, the temperature employed within the hydrolysis zone should be highly elevated ranging from about 150° to 350° C. Operation below such temperature range does not achieve the rapid reaction rates necessary for continuous operation and operation above such temperature range would involve uneconomically high pressures. The particular optimum temperature within this range for maximum conversion of the benzyl chloride without simultaneously producing substantial quantities of dibenzyl ether with very short reaction periods will vary depending upon such factors as the type and quantity of the alkaline component within the aqueous alkaline solution, the mol ratio of the alkaline component to the benzyl chloride as well as the degree of turbulent mixing of the reactants within the hydrolysis zone. Generally, however, maximum results are obtained when operating the hydrolysis at a temperature within the range of from about 180° to 275° C. or about 250° C. The pressure utilized in association with these temperatures can be varied but the pressure employed must be at a level at least sufficient to maintain the reactants in liquid phase at the operating temperatures. Typically, when operating within the above temperature ranges, the operating pressure within the hydrolysis zone can range from about 150 to 2400 pounds per square inch above atmospheric pressure with a preferred range being about 150 to 950 or about 600 pounds per square inch.

The reaction time or residence period of the reactants within the hydrolysis zone necessary to achieve substantially complete conversion of the benzyl chloride with a minimum simultaneous production of dibenzyl ether will vary depending upon such factors as the composition of the aqueous alkaline solution with particular regard to the type and concentration of the alkaline component, the degree of turbulence achieved within the hydrolysis zone, the number of theoretical mixing stage equivalents in series, as well as the temperature at which the hydrolysis takes place. Typically, however, when operating the hydrolysis according to the combination of processing features of this invention, the reaction period or residence time required for converting substantially all of the benzyl chloride to benzyl alcohol can be extremely short, for example ranging as low as from 1 to 2 minutes when operating at 190° C.

After the hydrolysis has been effected within the hydrolysis zone, the continuous effluent exiting from the zone can be treated by conventional procedures to recover the benzyl alcohol product contained therein. For example, after cooling the effluent, it can be first passed to a gas-liquid separator wherein the normally gaseous materials formed during the hydrolysis, such as carbon dioxide, produced when using sodium carbonate, can be separated from the liquid phase of the reaction effluent. The gaseous-free effluent can then be passed to a separation zone wherein the organic, oil phase composed primarily of benzyl alcohol can be separated from the aqueous phase of the effluent. Because this crude product is substantially free of unconverted benzyl chloride and dibenzyl ether it is not necessary to subject it to extensive purification according to the conventional procedures normally employed to purify a crude benzyl alcohol product. In fact, the crude product can be used directly in many benzyl alcohol applications without further purification. If, however, an extremely pure alcohol product is required, the only further purification required is a simple distillation of the crude product to obtain a high purity alcohol. If a solvent is used in the process, it can be separated from the crude alcohol product by distillation prior to or simultaneously with the final purification distillation.

The continuous process of this invention can be effected according to several different processing procedures and a typical procedure involves charging to a mixing zone a stream of benzyl chloride with or without an admixed solvent such as toluene and a second stream of an aqueous alkaline solution containing water and an alkaline component such as sodium carbonate. The proportion of the water and the alkaline component is adjusted to the desired concentration with the amount of the alkaline component being adjusted to the appropriate level of stoichiometric excess above the amount required to hydrolyze each mol of the benzyl chloride. The two streams are combined and continuously blended in the mixing zone and, if desired, warmed to an appropriate pre-reaction temperature and then are charged via pumping means as a single feed stream to a hydrolysis zone. The hydrolysis zone in this illustration comprises a shell and tube type reactor wherein the feed stream is charged to an elongated tube forming a continuous coil contained within the shell. The temperature of the tube is maintained at the desired level by passing a gaseous or liquid heating medium over the tube and the pressure within the tube is adjusted by regulation of the pumping means in association with valving at the outlet side of the tube. The flow rate of the feed stream is adjusted to the rate necessary to provide the desired level of turbulent flow within the elongated tube of the hydrolysis zone. The continuous effluent from the hydrolysis zone is first passed through a cooling zone wherein the effluent is cooled below the reaction temperature and then is passed through a gas-liquid separation zone wherein any gases formed during the hydrolysis, such as carbon dioxide by decomposition of sodium carbonate, are separated from the liquid reaction effluent. The gas-free liquid reaction effluent is then passed to a separation zone, such as a continuous decanter, wherein the organic, oil phase rich in benzyl alcohol is separated from the aqueous phase of the reaction effluent. The aqueous phase is then passed to a separation zone, for example an extractor where the aqueous phase can be contacted with a suitable solvent such as toluene to extract any residual benzyl alcohol contained therein. After removing the solvent by distillation, for example the recovered benzyl alcohol is passed to storage. The organic phase composed primarily of crude benzyl alcohol is directly passed to storage or, if desired, is passed to a purification zone, for example a distillation column, and the benzyl alcohol is recovered therefrom in a highly pure state substantially free of unconverted benzyl chloride and dibenzyl ether. If an inert solvent, such as toluene, is utilized in the process, then the organic oil phase is first passed to a solvent separation zone to remove the solvent prior to charging the organic phase to storage or to the purification zone.

The following example is offered to illustrate the process of this invention but it is not intended to limit the invention to the specific conditions and procedures illustrated therein:

EXAMPLE

The process of this invention was utilized for the continuous preparation of benzyl alcohol according to the following procedure:

The hydrolyzer which was employed for a series of process runs consisted of a shell and tube-type reactor where the tube was one continuous tube shaped in the form of a bundle of 20-foot lengths with return bends. The continuous tube contained within the shell or housing, consisted of a high nickel alloy tube having a length of about 480 feet and an inside diameter of 0.269 inch. Sample outlets were provided along the tube length at distances of 120, 220, 300, and 440 feet from the inlet. The reaction tube was heated by passing a heated fluid over the outside of the tube contained within the housing. The feed stream consisting of benzyl chloride, which in certain runs was admixed with a solvent, and an aqueous alkaline solution composed of an alkaline component and water was charged to the hydrolyzer by means of a pump which was adjusted to provide the desired flow rate. The pressure in the hydrolyzer was regulated by valving means at the outlet end of the tube. In the runs where a solvent was employed, it was used in equal weight parts with the benzyl chloride. The continuous effluent exiting from the hydrolyzer was first charged to a heat exchanger cooler and then to a gas-liquid separator where any normally gaseous materials were removed from the liquid reaction phase. The gas-free liquid stream was then passed to a continuous decanter where the organic, oil phase containing the major proportion of the crude benzyl alcohol product was recovered from the aqueous phase and analyzed without further purification. A series of different runs were conducted according to this procedure employing various processing conditions and the results of these runs as well as the conditions employed therefor are summarized in the following tables:

TABLE I.—FEED TO HYDROLYZER

| | Benzyl chloride rate | | Solvent type, rate, lb./min. | H₂O, lb./min. | Aqueous alkaline solution | | | | | Total feed rate lb./min. |
|---|---|---|---|---|---|---|---|---|---|---|
| | | | | | | Alkaline component | | | | |
| | | | | | Type | Rate | | Percent excess | Concentration wt. percent | |
| | Lb./min. | Mol./min. | | | | Lb./min. | Mol/min. | | | |
| Run No.: | | | | | | | | | | |
| 1 | 1.276 | 0.0101 | None | 6.255 | Na₂CO₃ | 0.695 | 0.00655 | 30 | 10 | 8.226 |
| 2 | 0.794 | 0.00627 | do | 3.232 | Na₂CO₃ | 0.538 | 0.00508 | 62 | 14.3 | 3.564 |
| 3 | 0.631 | 0.00498 | do | 2.158 | Na₂CO₃ | 0.322 | 0.00304 | 22 | 13.0 | 3.111 |
| 4 | 1.030 | 0.00814 | do | 3.271 | NaOH | 0.364 | 0.00909 | 11.7 | 10.0 | 4.665 |
| 5 | 0.561 | 0.00444 | Toluene 0.561 | 3.128 | Na₂CO₃ | 0.347 | 0.00327 | 47.5 | 10 | 4.597 |
| 6 | 0.898 | 0.00709 | Toluene 0.898 | 3.204 | NaOH | 0.356 | 0.00890 | 25.3 | 10 | 5.356 |

TABLE II.—HYDROLYZER CONDITIONS

| | Temperature, °C. | Pressure, p.s.i.g. | Reynolds No. (exit conditions) | Residence time, min. |
|---|---|---|---|---|
| Run No.: | | | | |
| 1 | 190 | 300 | 11,550 | 0.56 |
| 2 | 270 | 900 | 5,000 | 2.44 |
| 3 | 191 | 300 | 4,360 | 1.91 |
| 4 | 260 | 700 | 6,560 | 2.82 |
| 5 | 190 | 250 | 6,450 | 1.75 |
| 6 | 253 | 700 | 7,540 | 2.33 |

TABLE III.—PRODUCT COMPOSITION

| | Unconverted benzyl chloride, weight percent | Dibenzyl ether, weight percent |
|---|---|---|
| Run No.: | | |
| 1 | 0.032 | 3.40 |
| 2 | 0.004 | 4.20 |
| 3 | 0.448 | 3.90 |
| 4 | 0.0004 | 10.8 |
| 5 | 0.039 | 0.56 |
| 6 | 0.0004 | 2.50 |

We claim:
1. A continuous process for preparing benzyl alcohol which comprises continuously charging benzyl chloride, toluene solvent therefor, and an aqueous alkaline solution of sodium carbonate to a hydrolysis zone at a rate adjusted to provide a turbulent flow rate therein having a Reynolds number above about 2100, effecting the hydrolysis of the benzyl chloride to form benzyl alcohol at elevated temperature and pressure within the hydrolysis zone, continuously withdrawing the effluent from the hydrolysis zone and thereafter recovering the benzyl alcohol contained therein.

2. The process of claim 1, wherein the sodium carbonate is present in the aqueous alkaline solution in an amount of from about 5 to about 15 weight percent.

3. The process of claim 1, wherein the sodium carbonate contained within the aqueous alkaline solution is charged in an amount ranging from about 1 to about 75 mol percent above the amount stoichiometrically required to hydrolyze each mol of benzyl chloride.

4. The process of claim 1, wherein the aqueous alkaline solution contains from about 5 to about 15 weight percent of sodium carbonate and the sodium carbonate is charged in an amount ranging from about 5 to about 15 mol percent above the amount stoichiometrically required to hydrolyze each mol of benzyl chloride.

5. The process of claim 1, wherein the hydrolysis is effected at a temperature of from about 150° to about 350° C. and at a pressure sufficient to maintain the reactants in liquid phase.

6. The process of claim 5, wherein the temperature range is from about 180° to about 275° C.

7. The process of claim 1, wherein the Reynolds number is above about 4000.

8. The process of claim 1, wherein the benzyl chloride is charged in admixture with an aqueous alkaline solution containing water and from about 2 to about 20 weight percent of sodium carbonate with the amount of the sodium carbonate being adjusted to a range of from about 1 to about 75 mol percent above the amount stoichiometrically required to hydrolyze each mol of benzyl chloride, the admixture of benzyl chloride and the aqueous alkaline solution is charged to the hydrolysis zone at a rate adjusted to provide a flow rate therein having a Reynolds number above about 4000, and the hydrolysis of the benzyl chloride to benzyl alcohol is effected within the hydrolysis zone at a temperature of from about 150° to about 350° C. and at a pressure sufficient to maintain the reactants in liquid phase.

9. The process of claim 8, wherein the temperature is from about 180° to about 275° C.

10. The process of claim 8, wherein the sodium carbonate is present in the aqueous alkaline solution in an amount of from about 5 to about 15 weight percent and the amount of sodium carbonate is adjusted to a range of from about 5 to about 15 mol percent above the amount stoichiometrically required to hydrolyze each mol of benzyl chloride.

References Cited
UNITED STATES PATENTS

| | | | |
|---|---|---|---|
| 2,221,882 | 11/1940 | Rosenberg | 260—618 |
| 2,779,795 | 1/1957 | Gwynn | 260—604 |
| 3,150,171 | 9/1964 | Benning et al. | 260—618 |

BERNARD HELFIN, Primary Examiner